United States Patent
Takenaka et al.

(10) Patent No.: US 9,415,864 B2
(45) Date of Patent: Aug. 16, 2016

(54) MAIN LANDING GEAR BAY OF AIRCRAFT AND AIRCRAFT

(71) Applicant: MITSUBISHI AIRCRAFT CORPORATION, Aichi (JP)

(72) Inventors: Keizo Takenaka, Tokyo (JP); Keita Hatanaka, Aichi (JP); Masaru Kodama, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 60 days.

(21) Appl. No.: 14/301,792

(22) Filed: Jun. 11, 2014

(65) Prior Publication Data

US 2015/0001342 A1    Jan. 1, 2015

(30) Foreign Application Priority Data

Jun. 27, 2013 (JP) ................................ 2013-135494

(51) Int. Cl.
- *B64C 1/00* (2006.01)
- *B64C 25/12* (2006.01)
- *B64C 25/00* (2006.01)

(52) U.S. Cl.
CPC ........... *B64C 25/12* (2013.01); *B64C 2025/003* (2013.01)

(58) Field of Classification Search
CPC .. B64C 2025/003; B64C 25/12; B64C 25/20; B64C 25/14; B64C 2025/125; B64C 25/10; B64C 1/068; B64C 2001/0045
USPC ................................... 244/119, 102 A, 102 R
See application file for complete search history.

(56) References Cited

U.S. PATENT DOCUMENTS

| | | | | |
|---|---|---|---|---|
| 4,027,836 A * | 6/1977 | Seibel | ...................... | 244/103 R |
| 6,464,168 B1 * | 10/2002 | Swannell et al. | ......... | 244/102 A |
| 7,243,880 B2 * | 7/2007 | White et al. | ................ | 244/129.5 |
| 7,287,726 B2 * | 10/2007 | Briancourt | ................ | 244/102 R |
| 2003/0164424 A1 * | 9/2003 | Smith et al. | .................... | 244/105 |
| 2009/0057484 A1 * | 3/2009 | White | ......................... | 244/102 A |
| 2010/0084509 A1 * | 4/2010 | Weaver et al. | ............. | 244/102 R |
| 2012/0325966 A1 * | 12/2012 | Christenson et al. | ...... | 244/129.1 |

FOREIGN PATENT DOCUMENTS

JP      2004-050856 A    2/2004

OTHER PUBLICATIONS

"Aviation Maintenance Technical Handbook Airframe—vol. 2", FAA, pp. 13-7, Fig. 13-12, 2012.*
Boeing 737 Pictures.*

* cited by examiner

*Primary Examiner* — Brian M O'Hara
*Assistant Examiner* — Assres H Woldemaryam
(74) *Attorney, Agent, or Firm* — Pearne & Gordon LLP

(57) ABSTRACT

A main landing gear bay 15 which is formed inward of a fuselage 11 of an aircraft 10 from an opening portion provided in a surface of the fuselage 11 so as to store a main landing gear 13 of the aircraft 10, the main landing gear bay 15 including inclined regions 16 and 17 that are continuous from a rim of the opening portion to the fuselage 11 surface in an airframe axis direction X of the aircraft 10, wherein the inclined regions 16 and 17 are formed so as to have a larger depth toward the rim of the opening portion. Since the inclined regions 16 and 17 are formed so as to have a larger depth toward the rim of the opening portion, the aerodynamic drag acting on the main landing gear bay can be reduced. Accordingly, the fuel consumption of the aircraft can be improved.

7 Claims, 4 Drawing Sheets

PRIOR ART

MAIN LANDING GEAR BAY OF AIRCRAFT AND AIRCRAFT

BACKGROUND OF THE INVENTION

1. Field of the Invention

The present invention relates to a main landing gear bay which stores a main landing gear of an aircraft, and more particularly, to a technique for reducing an aerodynamic drag in the main landing gear bay.

2. Description of the Related Art

Main landing gears including wheels are widely used as an alighting gear of aircraft. Some main landing gears can be stored in a main landing gear bay that is a space provided in a lower portion of an airframe, and are deployed outside from the main landing gear bay on takeoff and landing.

Examples of the main landing gear bay which stores the main landing gear include a type including a door for closing an opening of the main landing gear bay so as to reduce an aerodynamic drag in a state in which the main landing gear is stored (e.g., Japanese Patent Laid-Open No. 2004-50856), and a type not including a door such that the main landing gear is exposed outside via an opening of the main landing gear bay.

Since the door is not provided in the main landing gear bay of the type in which the main landing gear is exposed outside, the weight of an airframe can be advantageously reduced by an amount corresponding to the weight of the door and a device for driving the door. In this type, however, since the main landing gear bay remains open during a flight, the aerodynamic drag tends to become relatively large as compared to that of the type including the door.

Recently, there is a strong demand for an improvement in fuel consumption for aircraft. To this end, reducing an aerodynamic drag generated in an airframe as well as improving the fuel consumption of an engine itself and reducing the weight of an airframe is considered as an important issue. As a result of intense study by the inventors of the present application, particularly, an aerodynamic drag generated in an opening portion of the main landing gear bay is estimated to account for a few % of an entire airframe drag of aircraft. Therefore, in the aircraft of the type in which the main landing gear bay remains open during a flight, it is expected to further reduce the aerodynamic drag generated in the main landing gear bay in order to improve the fuel consumption of the aircraft.

An object of the present invention is to reduce an aerodynamic drag in a main landing gear bay that remains open during a flight.

SUMMARY OF THE INVENTION

The present invention provides a main landing gear bay which is formed inward of a fuselage of an aircraft from an opening portion provided in a surface of the fuselage so as to store a main landing gear of the aircraft, the main landing gear bay including an inclined region that is continuous between a rim of the opening portion and the fuselage surface in an airframe axis direction of the aircraft, wherein the inclined region is inclined so as to have a larger depth toward the rim of the opening portion.

Since the inclined region between the opening portion and the fuselage surface is inclined so as to have a larger depth toward the rim of the opening portion, an aerodynamic drag acting on the main landing gear bay can be reduced. Accordingly, the main landing gear bay of the present invention contributes to improving the fuel consumption of the aircraft.

In the main landing gear bay of the present invention, the inclined region may be preferably formed on one or both of a front side and a rear side of the airframe axis direction of the aircraft.

When the inclined region is provided on the front side of the airframe axis direction of the aircraft, a force for pulling the aircraft to the rear side of the airframe axis direction, caused by a low-pressure region generated on the front side of the main landing gear bay during a flight can be reduced. The aerodynamic drag acting on the main landing gear bay can be thereby reduced. Also, in the main landing gear bay of the present invention, when the inclined region is provided on the rear side of the airframe axis direction, a force for pushing the aircraft to the rear side of a traveling direction, caused by a high-pressure region generated on the rear side of the main landing gear bay during a flight can be reduced. The aerodynamic drag acting on the main landing gear bay can be thereby reduced.

The front side and the rear side here can be defined based on a flight direction of the aircraft. The same applies hereinafter.

In the main landing gear bay of the present invention, the inclined region may be preferably formed within a range covered by the opening portion of the main landing gear bay in a direction perpendicular to the airframe axis direction.

In the main landing gear bay of the present invention, an inclined region continuous to outside of the range may be also provided. However, even when the inclined region is provided outside of the range, the aerodynamic drag acting on the main landing gear bay cannot be reduced. In some cases, an aerodynamic drag generated on the fuselage may be deteriorated. Thus, the inclined region (including one or both of the inclined region on the front side and the inclined region on the rear side) is preferably formed within the range.

Moreover, in the main landing gear bay of the present invention, the inclined region may become continuously deeper.

Since the inclined region becomes continuously deeper, a surface generating the aerodynamic drag can be minimized as compared to a case in which the inclined region is intermittently inclined, for example, in a staircase pattern. Thus, the aerodynamic drag can be effectively reduced.

The present invention provides an aircraft including the main landing gear bay described above. Since the aerodynamic drag in the main landing gear bay is reduced in the aircraft, the fuel consumption can be improved.

In accordance with the main landing gear bay of the present invention, since the inclined region that becomes deeper from the fuselage surface toward the rim of the opening portion is provided, the aerodynamic drag acting during a flight can be reduced. Accordingly, the main landing gear bay contributes to improving the fuel consumption of the aircraft.

BRIEF DESCRIPTION OF THE DRAWINGS

FIG. 2A is a view of the wheel stored in the storage bay as viewed from a bottom surface; and FIG. 2B is a sectional view along a direction Z-Z of FIG. 2A;

FIG. 3A shows a case in which the inclined region is provided; and FIG. 3B shows a conventional case in which the inclined region is not provided.

DETAILED DESCRIPTION OF THE PREFERRED EMBODIMENT

In the following, an embodiment according to the present invention is described in detail with reference to the accompanying drawings.

Figure 1:
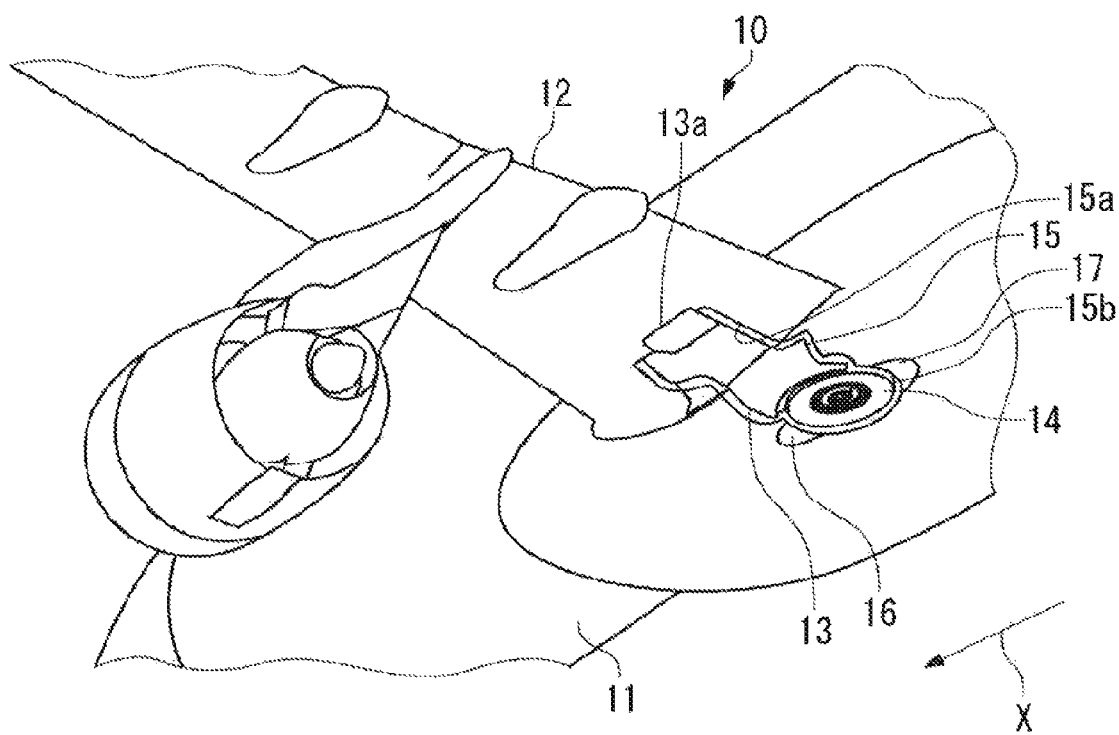
FIG. 1 is a perspective view illustrating a region close to a main landing gear bay of an aircraft according to an embodiment of the present invention.

As shown in FIG. 1, an aircraft 10 includes a right and left pair of main landing gears (alighting gears) 13 with respect to a center axis (also referred to as "airframe axis" below) of a fuselage 11 in the vicinity of a joint portion between the fuselage 11 and a main wing 12.

In each of the main landing gears 13, a proximal end portion 13a is rotatably coupled via a rotating shaft (not shown) to a structural member that is provided in the main wing 12. The main landing gear 13 also includes a wheel 14 for taxiing at a distal end portion (a lower end portion).

The main landing gear 13 can be stored within a main landing gear bay 15 that is formed from the fuselage 11 to the main wing 12. A hydraulic cylinder unit (not shown) is used to store the main landing gear 13 in the main landing gear bay 15 during a flight, and deploy the main landing gear 13 from the main landing gear bay 15 such that the wheel 14 at the distal end portion (the lower end portion) is located on the bottom by causing the main landing gear 13 to rotate about the rotating shaft at the time of takeoff and landing.

Figure 2A:
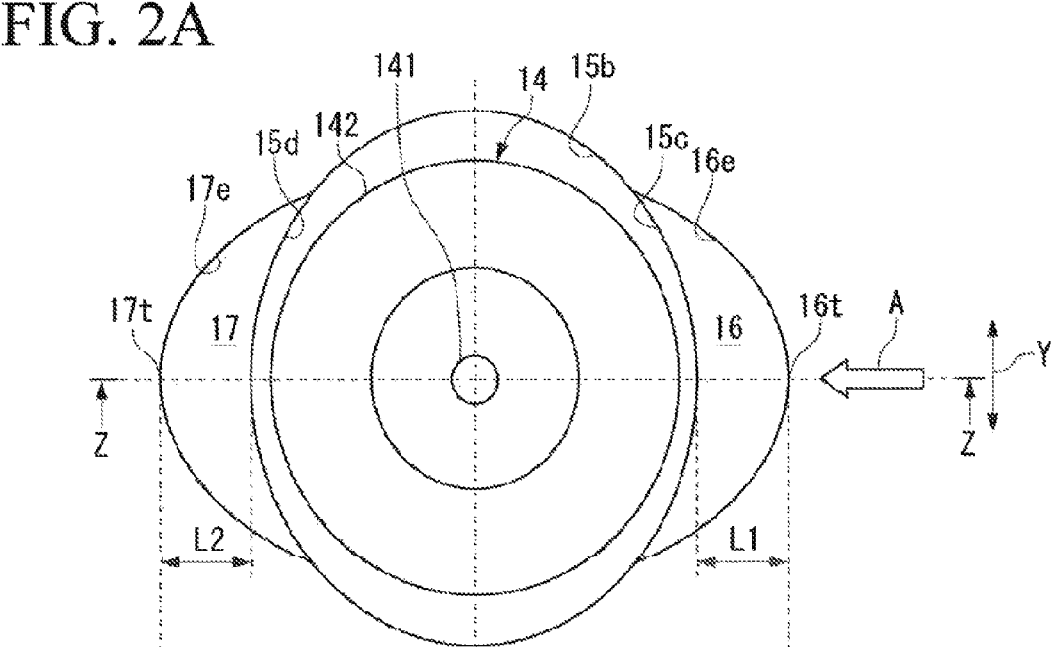
FIGS. 2A and 2B are views schematically illustrating a wheel and a storage bay.
Figure 2B:
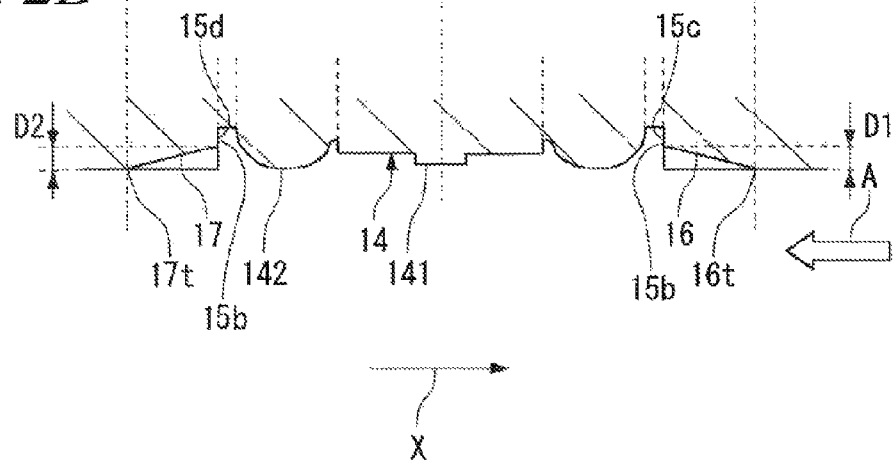

The main landing gear bay 15 is formed inward of the fuselage 11 from a surface of the fuselage 11, and includes a first storage bay 15a corresponding to the main landing gear 13 excluding the wheel 14, and a second storage bay 15b corresponding to the wheel 14. As shown in FIG. 2A, an opening shape of the second storage bay 15b is an elliptical shape, and an intersection between a long axis and a short axis thereof matches a rotation center of a rotating shaft 141 of a tire 142 of the wheel 14. The second storage bay 15b is defined by the surrounding fuselage 11, a front wall 15c that is formed on the side of an airframe axis direction X of the aircraft 10 with respect to the rotating shaft 141, and a rear wall 15d that is formed symmetrical to the front wall 15c with respect to the rotation center of the rotating shaft 141. FIG. 2B is a sectional view along a direction Z-Z of FIG. 2A.

The present embodiment is featured in the form of the surface of the fuselage 11 that surrounds the second storage bay 15b. That is, two gently inclined regions: a front-side inclined region 16 (simply referred to as inclined region 16 below) continuous to the front wall 15c from the fuselage 11, and a rear-side inclined region (simply referred to as inclined region 17 below) continuous to the rear wall 15d from the fuselage 11 are formed in the second storage bay 15b.

The inclined regions 16 and 17 are respectively defined by rims 16e and 17e, and the front wall 15c and the rear wall 15d. The rims 16e and 17e have an elliptical arc shape. Inner regions surrounded by the rims 16e and 17e are depressed from the surface of the surrounding fuselage 11 to form the inclined regions.

That is, the inclined region 16 is formed such that the depression becomes continuously deeper from a tip 16t on the rim 16e located at a frontmost position of the airframe axis direction X toward a rim of the second storage bay 15b. The inclined region 17 is formed such that the depression becomes continuously deeper from a tip 17t on the rim 17e located at a rearmost position of the airframe axis direction X toward a rim of the second storage bay 15b. The inclined region 16 and the inclined region 17 are formed so as to have the same level of inclination (inclination angle), and are provided at symmetrical positions with respect to the rotation center of the rotating shaft 141 of the tire 142 of the wheel 14 similarly to the front wall 15c and the rear wall 15d.

The inclined region 16 is gently formed so as to become deeper from the rim 16e to the center of the inclined region 16 in a direction Y perpendicular to the airframe axis direction X. Similarly, the inclined region 17 is gently formed so as to become deeper from the rim 17e to the center of the inclined region 17 in the direction Y. An increase in aerodynamic drag can be thereby suppressed.

As shown in FIG. 2B, an airflow A flowing opposite to the airframe axis direction X enters from the tip 16t of the inclined region 16, passes through the inclined region 16, the second storage bay 15b, and the inclined region 17, and exits from the tip 17t of the inclined region 17 during the flight of the aircraft 10. In the main landing gear bay 15 of the present embodiment, the inclined regions 16 and 17 are provided in the second storage bay 15b, so that an aerodynamic drag generated by the airflow A can be reduced.

Figure 3A:
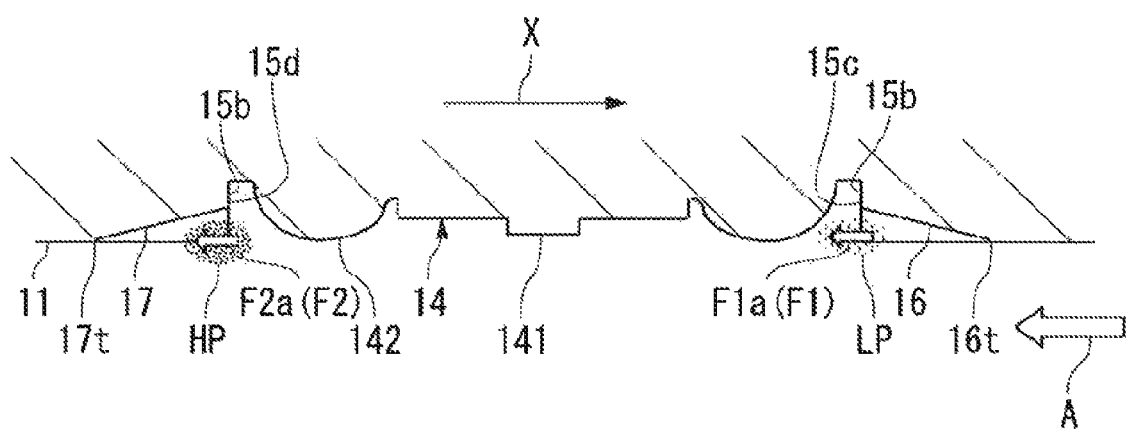
FIGS. 3A and 3B are views for explaining an operation and an effect of an inclined region of the main landing gear bay according to the present embodiment.
Figure 3B:
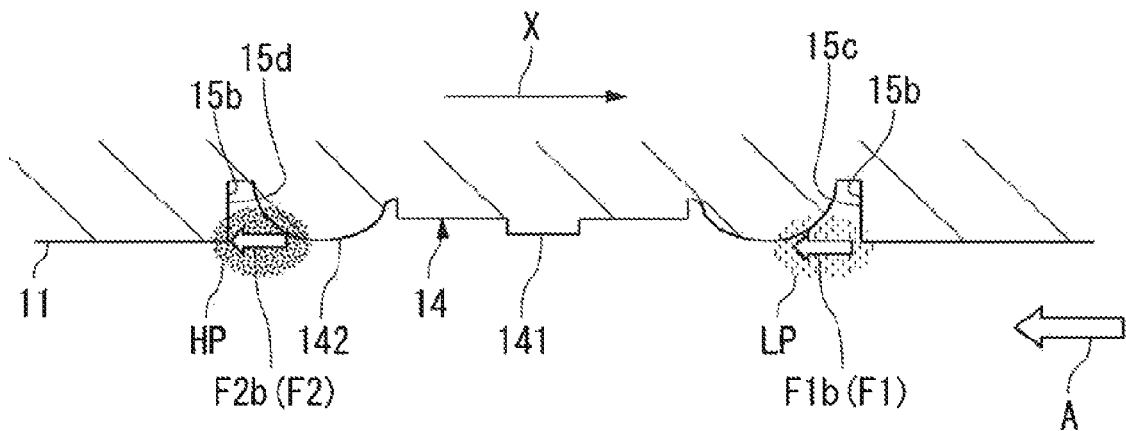

In a case in which the inclined regions 16 and 17 are not formed in the second storage bay 15b as shown in FIG. 3B, the airflow A flowing along the outer surface of the fuselage 11 separates from the outer surface while passing through the second storage bay 15b during the flight of the aircraft 10. Accordingly, a low-pressure region LP with a low pressure is formed in the vicinity of the front wall 15c of the second storage bay 15b. The low-pressure region LP formed by the airflow A acts as a force F1b for pulling the front wall 15c backwardly with respect to the airframe axis direction X, thereby generating a large aerodynamic drag on the aircraft 10. Since the airflow A partially strikes the rear wall 15d, a high-pressure HP with a high pressure is formed in the vicinity of the rear wall 15d of the second storage bay 15b. The high-pressure region HP acts as a force F2b for pushing the aircraft 10 backwardly, thereby generating a large aerodynamic drag on the aircraft 10.

When the influences of the low-pressure region LP and the high-pressure region HP are decreased, the aerodynamic drag generated on the aircraft 10 can be reduced. In the main landing gear bay 15 (the second storage bay 15b) of the present embodiment, the inclined region 16 is provided so as to decrease the influence of the low-pressure region LP, and the inclined region 17 is provided so as to decrease the influence of the high-pressure region HP.

When the inclined region 16 is provided as shown in FIG. 3A, the airflow A partially flows along the inclined region 16, so that the separation of the airflow A is suppressed. Thus, the degree of low pressure in the low-pressure region LP is decreased as compared to the case in which the inclined region is not provided (FIG. 3B). A "pulling force F1a" acting on the aircraft 10 due to the low-pressure region LP acts on the front wall 15c having a relatively small height as compared to that in FIG. 3B and the inclined region 16. The "pulling force F1a" is thereby considerably decreased.

When the inclined region 17 is provided as shown in FIG. 3A, the height of the rear wall 15d is decreased, and the airflow A partially passes along the gently inclined region 17. Thus, a "pushing force F2a" acting on the rear wall 15d and the inclined region 17 is small. That is, by providing the inclined region 17, the influence of the high-pressure region HP becomes relatively small as compared to that of the conventional main landing gear bay where the inclined region 17 is not provided as shown in FIG. 3B. The "pushing force F2a" is thereby considerably decreased.

By providing the inclined regions 16 and 17 as described above, the aerodynamic drag in the second storage bay 15*b* can be reduced to half that of the case in which the inclined regions 16 and 17 are not provided.

Moreover, since the inclined regions 16 and 17 are formed so as to become continuously deeper, a surface generating the aerodynamic drag is further reduced. The aerodynamic drag can be thereby effectively reduced.

While the inclined region 16 decreases the influence of the low-pressure region LP generated in the vicinity of the front wall 15*c*, the inclined region 17 decreases the influence of the high-pressure region HP generated in the vicinity of the rear wall 15*d*. The inclined regions 16 and 17 can be independently applied to the second storage bay 15*b*. That is, the effect of reducing the aerodynamic drag generated in the main landing gear bay 15 can be obtained to some extent even when only the inclined region 16 is provided, or even when only the inclined region 17 is provided. As a result of numerical analysis by the present inventors, the effect of reducing the aerodynamic drag by providing only the inclined region 17 is about twice as large as that of the case in which only the inclined region 16 is provided. Thus, when only one inclined region is provided on the front side or the rear side, the inclined region 17 is preferably provided on the rear side.

Lengths L1 and L2 of the inclined regions 16 and 17 in the airframe axis direction X, and depths D1 and D2 of the inclined regions 16 and 17 (see FIGS. 2A and 2B) are appropriately determined according to the specifications of an airframe of the aircraft such as the wheel 14 and the second storage bay 15*b*.

The inclined regions 16 and 17 described above are merely one example, and various changes may be made therein.

For example, although the rims 16*e* and 17*e* have an elliptical arc shape in the above embodiment, the rims 16*e* and 17*e* may have any shape as long as the effect of the inclined region in the present invention can be obtained. That is, the rims 16*e* and 17*e* of the inclined regions 16 and 17 may be respectively formed of combinations of arc portions 16*e*1 and 17*e*1, and linear portions 16*e*2 and 17*e*2 as shown in FIG. 4A.

Figure 4A:
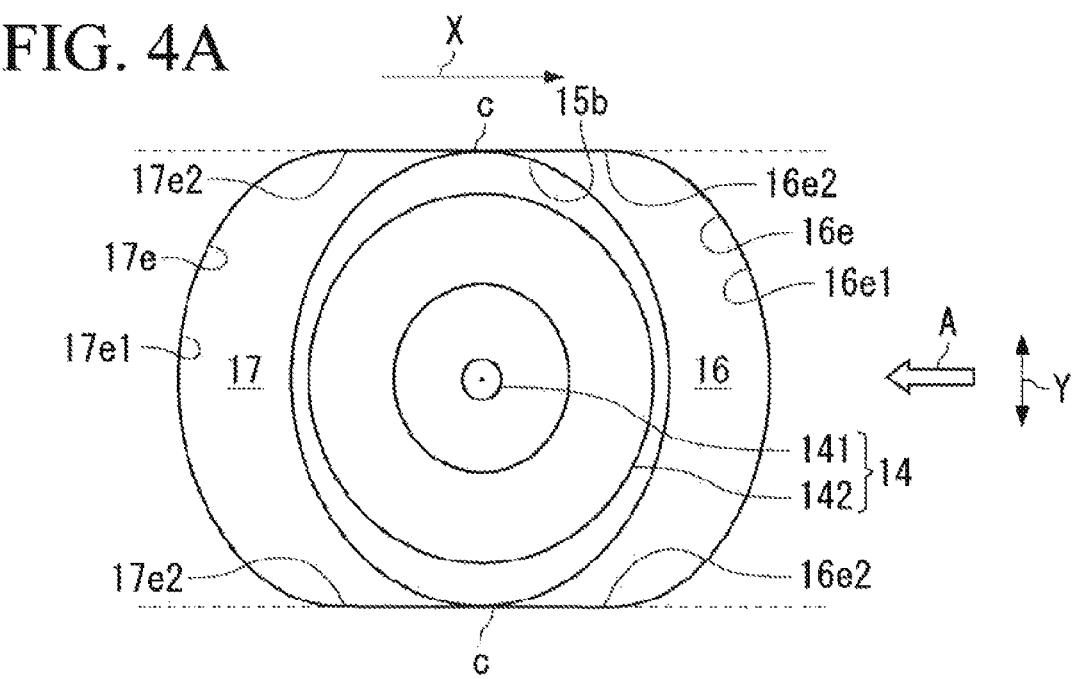
FIGS. 4A to 4C are views illustrating change examples of the present embodiment.

FIG. 4A shows a preferred embodiment of the inclined regions 16 and 17 which are the combinations of the arc portions and the linear portions. That is, the linear portions 16*e*2 and 17*e*2 are tangents to points C on an outer periphery of the second storage bay 15*b* (the points C are intersections between a straight line extending in the direction Y perpendicular to the airframe axis direction X and passing through the rotation center of the rotating shaft 141, and the outer periphery of the second storage bay 15*b*). The linear portions 16*e*2 and 17*e*2 are respectively continuous to the arc portions 16*e*1 and 17*e*1.

That is, the inclined regions 16 and 17 in FIG. 4A are formed continuously over entire ranges covered by the outer periphery of the second storage bay 15*b* in the direction Y. Therefore, the inclined region 16 is provided corresponding to the entire range along the front wall 15*c* where the low-pressure region LP is possibly formed. The inclined region 17 is provided corresponding to the entire range along the rear wall 15*d* where the high-pressure region HP is possibly formed. The inclined regions 16 and 17 can thereby more effectively reduce the pulling force F1 and the pushing force F2, respectively.

Figure 4B:
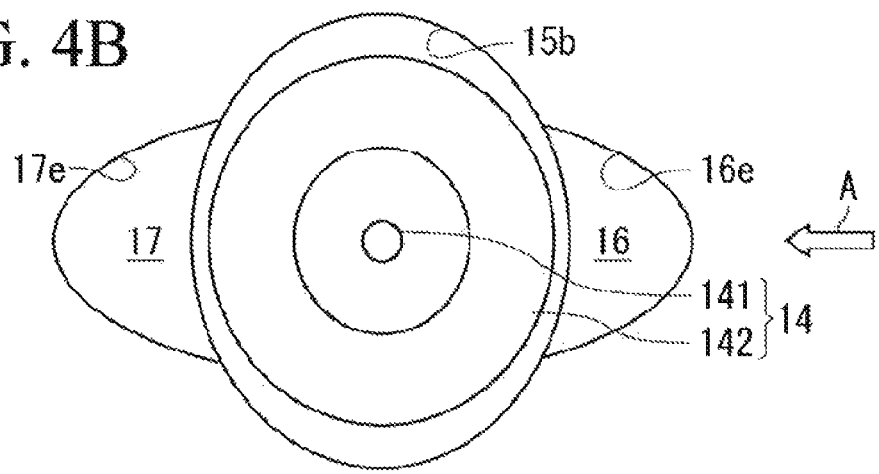

This is merely one example of the preferred embodiments. The inclined region 16 may be provided so as to be continuous to only one region of the front wall 15*c*, and the inclined region 17 may be provided so as to be continuous to only one region of the rear wall 15*d* as shown in FIGS. 2A and 4B. In order to obtain the effect of the present embodiment, the one region is preferably equal to or more than ½ of the entire region.

In the present invention, the inclined regions 16 and 17 may be also provided over the ranges covered by the outer periphery of the second storage bay 15*b* in the direction Y.

Figure 4C:
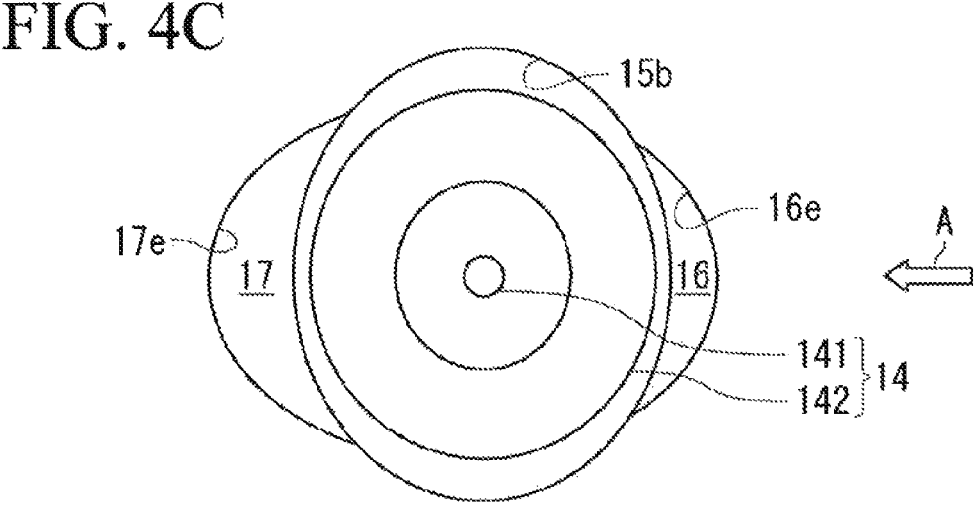

Although the inclined regions 16 and 17 have a symmetrical shape with respect to the rotation center of the rotating shaft 141 in FIGS. 1 to 3A, the present invention is not limited thereto. For example, the inclined regions 16 and 17 may have an asymmetrical shape with respect to the rotation center of the rotating shaft 141 as shown in FIG. 4C. In the example in FIG. 4C, the inclined regions 16 and 17 are made asymmetrical by making a surface area of the inclined region 17 larger than a surface area of the inclined region 16. The surface area of the inclined region 16 may be made larger than the surface area of the inclined region 17.

Although the embodiments of the inclined regions 16 and 17 whose depth continuously changes have been described above, the present invention is not limited thereto. The depth may change in any manner as long as the effect of reducing the aerodynamic drag described using FIGS. 3A and 3B can be obtained. For example, the depth of the inclined region of the present invention may intermittently change like a staircase pattern. The inclined region of the present invention is not limited to the one whose depth linearly changes, and may be formed of, for example, an arc surface having a curvature. Moreover, the angle of inclination is not limited to a fixed angle. The inclined region may be formed by connecting flat surfaces having different inclination angles. In the case of applying the arc surface, the inclined region may be formed by connecting arc surfaces having different curvatures. These various forms of inclined regions can also produce the aerodynamic drag reducing effect of the same level as that of the inclined regions 16 and 17 whose depth continuously changes.

What is claimed is:

1. An Aircraft comprising:
   a fuselage having a longitudinal axis direction and a bottom surface;
   a main landing gear bay formed inside the fuselage of the aircraft, the main landing gear bay having a storage bay for storing a wheel, the storage bay being defined by at least one wall extending into the fuselage, said at least one wall defining an opening in the bottom surface for accommodating the wheel; and
   at least one inclined region forming a depression in the bottom surface of the fuselage and extending along said longitudinal axis direction from said at least one wall to a rim of the inclined region, said at least one inclined region becoming continuously deeper from the rim to said at least one wall.

2. The main landing gear bay of the aircraft according to claim 1, wherein the at least one inclined region is formed on one or both of a front side and a rear side of the opening in the bottom surface.

3. The main landing gear bay of the aircraft according to claim 1, wherein the at least one inclined region is formed within a range covered by the opening in a direction perpendicular to the longitudinal axis direction.

4. The main landing gear bay of the aircraft according to claim 2, wherein the at least one inclined region is formed within a range covered by the opening in a direction perpendicular to the longitudinal axis direction.

5. The main landing gear bay of the aircraft according to claim 2, wherein the at least one inclined region is formed on the front side of the opening in the bottom surface.

6. The main landing gear bay of the aircraft according to claim 2, wherein the at least one inclined region is formed on the rear side of the opening in the bottom surface.

7. The main landing gear bay of the aircraft according to claim 2, wherein the at least one inclined region is formed on both of the front side and the rear side of the opening in the bottom surface.

* * * * *